United States Patent [19]

Taylor

[11] 4,233,685

[45] Nov. 11, 1980

[54] RADIO FOR RECEIVING AND REPRODUCING INFORMATION BROADCAST ON THE INTERMEDIATE FREQUENCY

[75] Inventor: Stephen C. Taylor, Hadleigh, England

[73] Assignee: Ford Motor Company, Dearborn, Mich.

[21] Appl. No.: 97,077

[22] Filed: Nov. 23, 1979

[51] Int. Cl.³ .............................................. H04B 1/26
[52] U.S. Cl. ...................................... 455/151; 455/4; 455/70; 455/228; 455/352
[58] Field of Search ........................ 455/68, 70, 4, 151, 455/152, 227, 228, 352

[56] References Cited

U.S. PATENT DOCUMENTS

| | | | |
|---|---|---|---|
| 2,429,607 | 10/1947 | Capen | 455/152 |
| 3,257,617 | 6/1966 | Goldmark et al. | 455/228 |
| 3,639,686 | 2/1972 | Walker et al. | 455/151 |
| 3,684,823 | 8/1972 | McVoy | 455/352 |
| 3,739,283 | 6/1973 | Colligan | 455/290 |

*Primary Examiner*—Marc E. Bookbinder
*Attorney, Agent, or Firm*—Paul K. Godwin, Jr.; Clifford L. Sadler

[57] ABSTRACT

A superheterodyne radio receiver which is simultaneously tuned to receive both signals selectively tuned within the general AM broadcast spectrum and signals transmitted at the intermediate frequency, as defined in the receiver. The receiver responds to predetermined coded signals on the broadcast intermediate frequency signal to inhibit the local oscillator in preference to subsequent information broadcast on the intermediate frequency.

3 Claims, 1 Drawing Figure

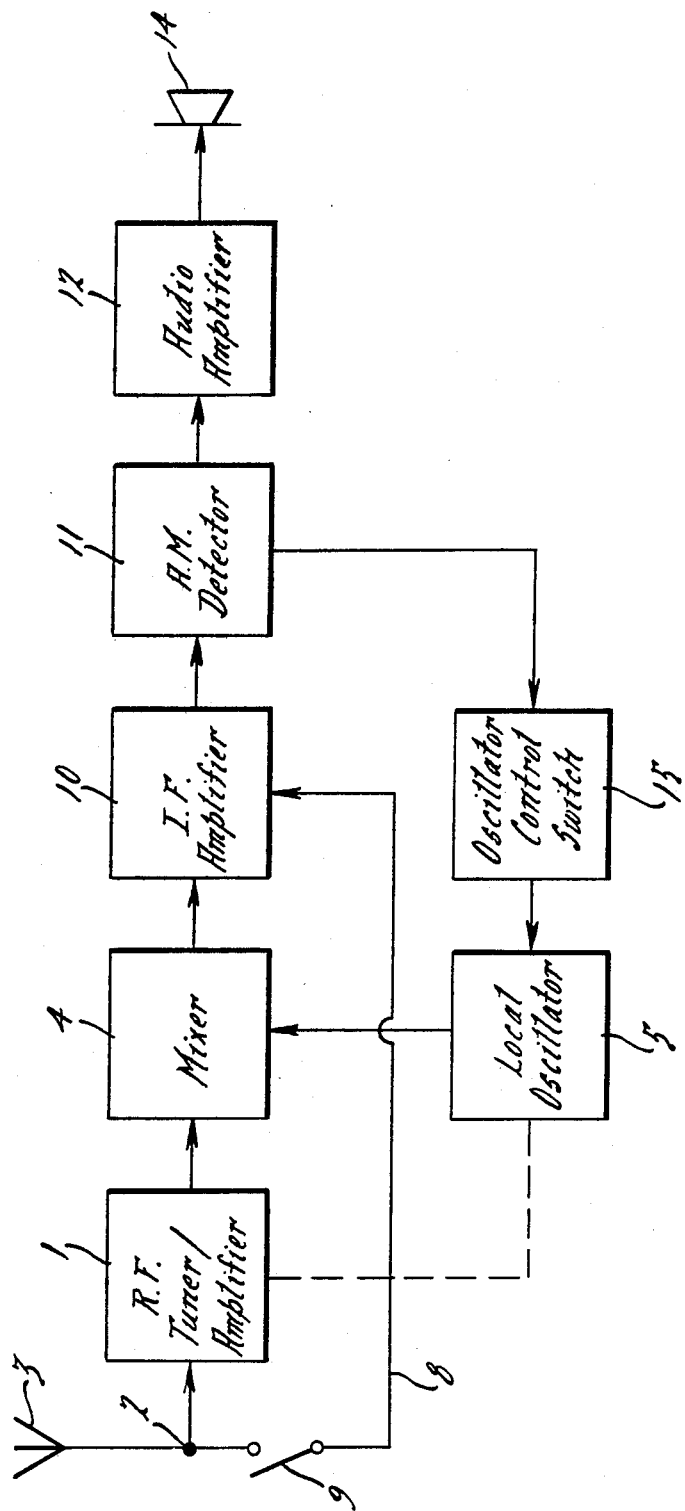

RADIO FOR RECEIVING AND REPRODUCING INFORMATION BROADCAST ON THE INTERMEDIATE FREQUENCY

BACKGROUND OF THE INVENTION

1. Field of the Invention

This invention relates to the field of radio receivers, and more particularly to local broadcast tuning.

2. Description of the Prior Art

A conventional AM radio receiver comprises an antenna, a radio frequency amplifier which is arranged to amplify transmitted audio modulated (AM) signals of a selectably tuned frequency, received by the antenna; a local oscillator for producing an unmodulated oscillator signal of a frequency differing from the frequency of the selected radio frequency signal by a predetermined amount; a mixer for mixing the local oscillator signal with the amplified radio frequency signal to produce an intermediate frequency signal modulated as the signal derived from the radio frequency amplifier; an intermediate frequency amplifier for amplifying the said intermediate frequency signal; and a detector for producing an audio frequency signal from the amplified intermediate frequency signal.

In order to avoid interference between transmitted radio frequency signals and the intermediate frequency signals, the radio receiver must be tuned to produce an intermediate frequency signal different from any transmitted radio signals. Under international agreements, broadcasting authorities refrain from broadcasting on selected radio frequencies so that these frequencies can be used by radio manufacturers as the intermediate frequency of the radio receiver. Thus, for example, in the United Kingdom, all radio receivers operate on an intermediate frequency signal of 465 kHZ.

In such radio receivers, the radio frequency amplifier must be re-tuned to a different frequency when it is desired to receive a transmission by a different broadcasting station. In a motor vehicle, a driver may be compelled to re-tune the receiver several times during a long journey, particularly if he wishes to obtain such information as local whether or traffic condition broadcasts from local stations.

In a recently proposed broadcasting system, transmissions from short-range transmitters relating to purely local information, such as local weather alerts or traffic conditions, would all be broadcast on a single radio frequency, e.g., 526.5 kHZ. A driver of a vehicle with a conventional radio could therefore stay tuned to that frequency and receive local information broadcasts without re-tuning the radio receiver during his journey. It has been suggested that the proposed system would commence and terminate each individual local broadcast with a predetermined radio frequency signal and that such a signal could be used to trigger a switching circuit within the radio and the radio receiver would automatically re-tune itself to the frequency at which the local information was being broadcast. The present invention performs the suggested function in a unique manner.

SUMMARY OF THE INVENTION

It is an object of the present invention to provide a radio receiver which is automatically tuned to receive a transmission at a desired radio frequency in response to the transmission of a predetermined radio frequency signal on the frequency.

It is another object of the present invention to provide a superheterodyne radio receiver employing an intermediate frequency stage connectable to receive and pass intermediate frequency signals received by the receiver antenna.

It is a further object of the present invention to provide a radio receiver which may be simultaneously tuned to receive broadcast signals at a selected frequency within the AM broadcast spectrum and broadcast signals at the intermediate frequency of the receiver.

In the present invention, the radio receiver comprises an antenna; a radio frequency amplifier for amplifying transmitted radio frequency signals of a selectably tuned frequency and received by the antenna; a local oscillator for producing a local oscillator signal of a frequency differing from the frequency of the selected radio frequency signal by a predetermined amount; a mixer for mixing the local oscillator signal with the amplified radio frequency signal to produce an intermediate frequency signal modulated as the signal from the radio frequency amplifier; an intermediate frequency tuned amplifier for amplifying the signal from the mixer; and a detector for producing an audio frequency signal from the amplified intermediate frequency signal. In the present invention, the intermediate frequency amplifier may also be connected to the antenna so as to amplify received intermediate radio frequency signals transmitted by a local station. These signals are not usually amplified by the tuned radio frequency amplifier since that amplifier is normally tuned to a frequency within the general AM broadcast spectrum. In addition, means are provided for inhibiting and starting the supply of receiver generated intermediate frequency signals to the intermediate frequency amplifier in response to coded signals respectively transmitted before and after the local information broadcast at the intermediate radio frequency.

By arranging for the intermediate frequency amplifier to always be tuned to the same frequency at which the local information radio frequency signal is broadcast, rather than the frequency conventionally used in the intermediate stage of a radio receiver, the radio receiver becomes effectively automatically re-tuned to that local information broadcast frequency when the coded signal is received.

The detector is operable, in response to the coded signals to generate a signal pulse which inhibits or starts the local oscillator. The local oscillator is associated with the bi-stable switch that receives the signal pulse from the detector and operates to switch the local oscillator on and off in response to successive signal pulses.

BRIEF DESCRIPTION OF THE DRAWING

The FIGURE is a block diagram of the preferred embodiment of the invention.

DETAILED DESCRIPTION OF THE PREFERRED EMBODIMENT

The radio receiver of the present invention is intended for adapting a conventional AM receiver to also receive short-range radio transmissions of relatively short duration, e.g., local weather and traffic reports, locally broadcast at a single radio frequency. These low power local broadcasts are preceded by a signal code, which is transmitted to effect automatic re-tuning of the radio receiver to that frequency at the start of each transmission. Upon termination of each transmission, a further signal code is transmitted to effect automatic re-tuning of the radio receiver to the originally selected frequency. The signal codes are in the form of multiplexed radio frequency signals capable of separation from the main broadcast signal by a decoding circuit.

Referring to the drawing, the radio receiver includes an antenna 3 connected via an input line 2 to a tunable radio frequency amplifier 1. The radio frequency amplifier 1 is of conventional construction and is capable of being tuned by a manual control (not shown) to select and amplify transmitted radio frequency signals received at the antenna 3. As indicated by a broken line in the drawing, a local oscillator circuit 5 is coupled with the radio frequency amplifier 1 to generate signals which always differ in frequency by a predetermined amount from the signals to which the amplifier 1 is tuned to receive. The amplified signals from the radio frequency amplifier 1 are fed to a mixer circuit 4, also of conventional construction, which mixes the amplified signals with a signal from the local oscillator circuit 5. The mixer circuit 4 produces an intermediate frequency signal output which is derived from the radio frequency amplifier 1, but which has a frequency equal to the constant difference between the frequencies to which the amplifier 1 and the local oscillator 5 are tuned. The intermediate frequency signals from the mixer 4 are fed to an intermediate frequency amplifier 10, which is continuously tuned to the frequency difference of the radio frequency amplifier 1 and the oscillator 5. The amplified intermediate frequency signals are then fed to a detector circuit 11 which demodulates the intermediate frequency signals and produces an audio frequency signal which is fed to an audio frequency amplifier 12. The amplified audio frequency signal is then reproduced audibly in a loudspeaker 14.

A bypass line 8 directly couples the antenna input 2 with the intermediate frequency amplifier 10 via a switch 9. When the switch 9 is closed, signals from the antenna 3 are simultaneously fed to both the intermediate amplifier 4 and the radio frequency amplifier 1.

In use, when the switch 9 is open and the local oscillator 5 is on, the radio receiver operates in the same way as a conventional superheterodyne receiver. Thus, the amplifier 1 is tuned to a frequency corresponding to a desired radio broadcasting channel. Transmitted signals at that frequency are received by the antenna, amplified in the radio frequency amplifier, and the amplified signals are mixed with the signals generated by the local oscillator 5. The signals produced in the mixer 4 will have a frequency equal to the difference in the frequencies to which the local oscillator 5 and amplifier 1 are tuned. Unlike conventional radio receivers, however, this frequency difference is set to the frequency of the local information broadcast frequency (e.g., 526.5 kHZ), rather than the conventional intermediate frequency setting (e.g., 465 kHZ). The intermediate frequency signal is then amplified in the amplifier 10 and demodulated in the detector 11. The resulting audio frequency signal is amplified and reproduced in the amplifier 12 and loudspeaker 14.

With the switch 9 closed, the receiver continues to operate in the manner described above until a radio signal code, transmitted at the frequency to which the intermediate amplifier is tuned, is received by the antenna 3. The radio signal code, which will normally be at a different frequency from that to which the radio frequency amplifier 1 is tuned, is therefore rejected by the radio frequency amplifier 1 and is amplified directly by the intermediate frequency amplifier 10.

The detector circuit 11 is configured to generate signal pulses in response to the radio signal code. The signal pulses are used to operate a switch circuit 15 which alternately stops and starts the local oscillator 5. Thus, the detector 11 includes a conventional decoding circuit which outputs signals of a predetermined characteristic to the switch circuit 15, rather than to the audio frequency amplifier 12, and the switch circuit 15 is in the form of a conventional bi-stable circuit or flip-flop which operates in response to successive signals from the detector 11.

The detector 11 generates a signal pulse which is derived from the amplified radio signal code and this pulse is used to inhibit the local oscillator 5 via switch circuit 15. Thereafter, the radio signals at the frequency which the amplifier 1 is tuned are no longer converted to the intermediate frequency by the mixer 4 and the signals output by the intermediate frequency amplifier 10 are derived solely from those transmitted at the intermediate frequency and received at the antenna 3. These signals are demodulated by the detector 11 and fed to the audio frequency amplifier 12 for reproduction in the loudspeaker 14. As a result, the information broadcast on the intermediate frequency will be received and reproduced by the radio receiver regardless of the frequency to which the radio frequency amplifier 1 is tuned.

When the local information transmission at the intermediate frequency ends, a termination signal code is broadcast. A termination signal pulse is derived from this signal code by the detector 11 and is passed to the switch 15 circuit which reactivates the local oscillator 5. The receiver then resumes reproduction of the signals broadcast at the radio frequency to which the amplifier 1 is tuned.

I claim:
1. A radio receiver comprising:
   an antenna;
   a radio frequency amplifier for amplifying antenna received radio frequency signals of a selected frequency;
   a local oscillator for producing an oscillator signal of a frequency differing from the frequency of the selected radio frequency signals by a predetermined amount;
   a mixer for mixing the oscillator signal with the radio frequency signal to produce a radio frequency amplifier derived intermediate frequency signal;
   an intermediate frequency amplifier for amplifying the signal from the mixer;
   a detector producing audio frequency signals from the amplified signal from the mixer;
   wherein the intermediate frequency amplifier is also connected to amplify antenna received radio frequency signals at the intermediate frequency, and said receiver includes means for stopping and starting the production of radio frequency amplifier derived intermediate frequency signals to the intermediate frequency amplifier in response to predetermined signals transmitted at the intermediate frequency.
2. A radio receiver as in claim 1, wherein the detector in responsive to said predetermined signals to respectively generate a signal pulse which inhibits and starts the local oscillator.
3. A radio receiver as in claims 1 or 2, wherein the intermediate frequency amplifier is connected to receive signals directly from the antenna and amplify those received at the intermediate frequency.

* * * * *